(12) United States Patent
Lu et al.

(10) Patent No.: US 8,730,603 B2
(45) Date of Patent: May 20, 2014

(54) POWER MANAGEMENT FOR STORAGE DEVICE READ CHANNEL

(75) Inventors: Jing Lu, San Jose, CA (US); Lei Chen, Sunnyvale, CA (US); Johnson Yen, Fremont, CA (US)

(73) Assignee: LSI Corporation, San Jose, CA (US)

( * ) Notice: Subject to any disclaimer, the term of this patent is extended or adjusted under 35 U.S.C. 154(b) by 14 days.

(21) Appl. No.: 13/609,387

(22) Filed: Sep. 11, 2012

(65) Prior Publication Data

US 2014/0071558 A1    Mar. 13, 2014

(51) Int. Cl.
*G11B 5/09* (2006.01)
*G11B 5/02* (2006.01)
*G11B 15/18* (2006.01)

(52) U.S. Cl.
USPC ............ 360/46; 360/51; 360/67; 360/69

(58) Field of Classification Search
None
See application file for complete search history.

(56) References Cited

U.S. PATENT DOCUMENTS

| | | | |
|---|---|---|---|
| 7,352,641 B1 | 4/2008 | Wu | |
| 7,872,825 B2 | 1/2011 | Sanghvi | |
| 8,001,355 B2 | 8/2011 | Inomata et al. | |
| 8,181,083 B2 | 5/2012 | Rovini et al. | |
| 8,219,777 B2 | 7/2012 | Jacobson et al. | |
| 8,418,023 B2 * | 4/2013 | Gunnam et al. | 714/758 |
| 2010/0037121 A1 * | 2/2010 | Jin et al. | 714/763 |
| 2012/0330584 A1 * | 12/2012 | Xu et al. | 702/61 |

OTHER PUBLICATIONS

C. Marchand et al., "Conflict Resolution for Pipelined Layered LDPC Decoders," IEEE Workshop on Signal Processing Systems (SIPS), Oct. 2009, pp. 220-225, Tempere, Finland.
P. Bailis et al., "Dimetrodon: Processor-Level Preventive Thermal Management Via Idle Cycle Injection," ACM 48th Design Automation Conference (DAC), Jun. 2011, pp. 89-94.

* cited by examiner

*Primary Examiner* — Regina N Holder
(74) *Attorney, Agent, or Firm* — Ryan, Mason & Lewis, LLP (57) ABSTRACT

A hard disk drive or other storage device comprises a storage medium, a read head configured to read data from the storage medium, and control circuitry coupled to the read head and configured to process data received from the read head. The control circuitry comprises read channel circuitry that includes a low-density parity check decoder or other type of decoder. Power management circuitry associated with the read channel circuitry is configured to detect a power control condition of the read channel circuitry and to control insertion of idle clock cycles in a clock signal supplied to the decoder responsive to the detected power control condition. For example, the read channel circuitry may comprise a clock generator configured to gate the clock signal responsive to a control signal from the power management circuitry.

20 Claims, 5 Drawing Sheets

FIG. 7

POWER MANAGEMENT FOR STORAGE DEVICE READ CHANNEL

BACKGROUND

Disk-based storage devices such as hard disk drives (HDDs) are used to provide non-volatile data storage in a wide variety of different types of data processing systems. A typical HDD comprises a spindle which holds one or more flat circular storage disks, also referred to as platters. Each storage disk comprises a substrate made from a non-magnetic material, such as aluminum or glass, which is coated with one or more thin layers of magnetic material. In operation, data is read from and written to tracks of the storage disk via a read/write head that is moved precisely across the disk surface by a positioning arm as the disk spins at high speed.

The storage capacity of HDDs continues to increase, and HDDs that can store multiple terabytes (TB) of data are currently available. However, increasing the storage capacity often involves shrinking track dimensions, bit lengths or other features in order to fit more data onto each storage disk, which can lead to a variety of problems, including degraded on-track recording performance, as well as off-track recording performance issues such as adjacent track erasure.

A number of techniques have been developed in an attempt to further increase storage capacity. For example, a technique known as shingled magnetic recording (SMR) attempts to increase storage capacity of an HDD by "shingling" a given track over a previously written adjacent track on a storage disk. In another technique, referred to as bit-patterned media (BPM), high density tracks of magnetic islands are preformed on the surface of the storage disk, and bits of data are written to respective ones of these islands. Other techniques include, for example, heat-assisted magnetic recording (HAMR) and microwave-assisted magnetic recording (MAMR). The HAMR technique utilizes a laser to locally preheat an area on the disk surface prior to recording in that area. In the MAMR technique, an additional write head is configured to emit an AC magnetic field that excites ferromagnetic resonance in the media, building up energy that eases the process of writing data.

HDDs often include a system-on-chip (SOC) to process data from a computer or other processing device into a suitable form to be written to the storage disk, and to transform signal waveforms read back from the storage disk into data for delivery to the computer. The SOC has extensive digital circuitry and has typically utilized advanced complementary metal-oxide-semiconductor (CMOS) technologies to meet cost and performance objectives. Such digital circuitry may include a disk controller and associated read channel circuitry. The HDD also generally includes a preamplifier that interfaces the SOC to the read/write head used to read data from and write data to the storage disk. As is well known, the read/write head may comprise, for example, separate read and write heads.

In order to improve the data readout performance of the HDD, the read channel circuitry often incorporates error correction coding functionality, which may be illustratively implemented using a low-density parity check (LDPC) code. However, as storage densities have increased, the complexity of the LDPC codes has also increased, such that multi-level LDPC codes are now in widespread use. This has led to a significant increase in the complexity of the read channel circuitry of the HDD, as well as a corresponding increase in power consumption of the SOC containing the read channel circuitry. Also, higher integrated circuit packaging costs are often incurred as a result of the increased power consumption.

SUMMARY

Illustrative embodiments of the invention include HDDs or other types of storage devices that exhibit enhanced operating performance and lower packaging costs by implementing power management for read channel circuitry that incorporates an LDPC decoder or other type of decoder.

In one embodiment, a storage device comprises a storage medium, a read head configured to read data from the storage medium, and control circuitry coupled to the read head and configured to process data received from the read head. The control circuitry comprises read channel circuitry that includes a decoder. Power management circuitry associated with the read channel circuitry is configured to detect a power control condition of the read channel circuitry and to control insertion of idle clock cycles in a clock signal supplied to the decoder responsive to the detected power control condition.

By way of example, the read channel circuitry may comprise a clock generator configured to provide the clock signal to the decoder, with the clock generator being configured to gate the clock signal responsive to a control signal from the power management circuitry.

One or more of the embodiments of the invention provide significant improvements in HDDs and other types of storage devices. For example, by inserting idle clock cycles into a clock signal supplied to an LDPC decoder or other type of decoder responsive to one or more detected power control conditions of its associated read channel circuitry, overall power consumption of the storage device is controlled in an efficient manner, leading to improved operating performance and lower packaging costs. These improvements are obtained without adversely impacting circuit area requirements and achievable error rate.

DETAILED DESCRIPTION

Embodiments of the invention will be illustrated herein in conjunction with exemplary disk-based storage devices, read channel circuitry and associated power management circuitry for controlling read channel decoder power consumption. It should be understood, however, that these and other embodiments of the invention are more generally applicable to any storage device in which improved control of read channel power consumption is desired. Additional embodiments may be implemented using components other than those specifically shown and described in conjunction with the illustrative embodiments.

Figure 1:
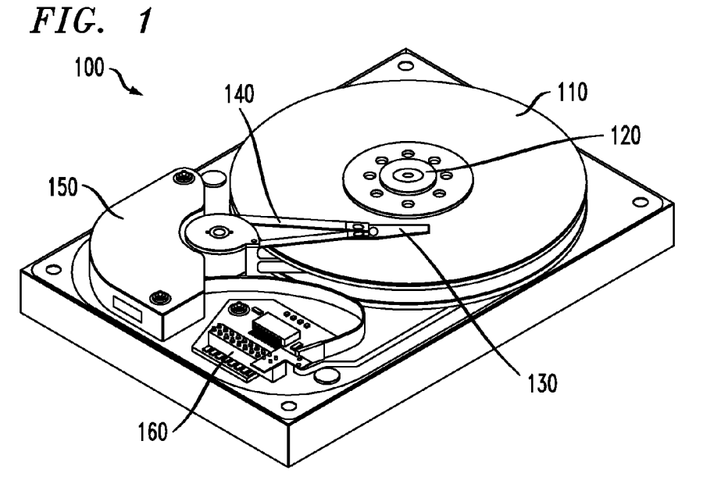
FIG. 1 shows a perspective view of a disk-based storage device in accordance with read channel power management in an illustrative embodiment of the invention.

FIG. 1 shows a disk-based storage device 100 in accordance with an illustrative embodiment of the invention. The storage device 100 in this embodiment more specifically comprises an HDD that includes a storage disk 110. The storage disk 110 has a storage surface coated with one or more magnetic materials that are capable of storing data bits in the form of respective groups of media grains oriented in a common magnetization direction (e.g., up or down). The storage disk 110 is connected to a spindle 120. The spindle 120 is driven by a spindle motor, not explicitly shown in the figure, in order to spin the storage disk 110 at high speed.

Data is read from and written to the storage disk 110 via a read/write head 130 that is mounted on a positioning arm 140. It is to be appreciated that the head 130 is shown only generally in FIG. 1. The position of the read/write head 130 over the magnetic surface of the storage disk 110 is controlled by an electromagnetic actuator 150. The electromagnetic actuator 150 and its associated driver circuitry in the present embodiment may be viewed as comprising a portion of what is more generally referred to herein as "control circuitry" of the storage device 100. Such control circuitry in this embodiment is assumed to further include additional electronics components arranged on an opposite side of the assembly and therefore not visible in the perspective view of FIG. 1.

The term "control circuitry" as used herein is therefore intended to be broadly construed so as to encompass, by way of example and without limitation, drive electronics, signal processing electronics, and associated processing and memory circuitry, and may encompass additional or alternative elements utilized to control positioning of a read/write head relative to a storage surface of a storage disk in a storage device. A connector 160 is used to connect the storage device 100 to a host computer or other related processing device.

It is to be appreciated that, although FIG. 1 shows an embodiment of the invention with only one instance of each of the single storage disk 110, read/write head 130, and positioning arm 140, this is by way of illustrative example only, and alternative embodiments of the invention may comprise multiple instances of one or more of these or other drive components. For example, one such alternative embodiment may comprise multiple storage disks attached to the same spindle so all such disks rotate at the same speed, and multiple read/write heads and associated positioning arms coupled to one or more actuators.

A given read/write head as that term is broadly used herein may be implemented in the form of a combination of separate read and write heads. More particularly, the term "read/write" as used herein is intended to be construed broadly as read and/or write, such that a read/write head may comprise a read head only, a write head only, a single head used for both reading and writing, or a combination of separate read and write heads. A given read/write head such as read/write head 130 may therefore include both a read head and a write head. Such heads may comprise, for example, write heads with wrap-around or side-shielded main poles, or any other types of heads suitable for recording and/or reading data on a storage disk. Read/write head 130 when configured to perform read or write operations may be referred to herein as simply a read head or a write head, respectively.

Also, the storage device 100 as illustrated in FIG. 1 may include other elements in addition to or in place of those specifically shown, including one or more elements of a type commonly found in a conventional implementation of such a storage device. These and other conventional elements, being well understood by those skilled in the art, are not described in detail herein. It should also be understood that the particular arrangement of elements shown in FIG. 1 is presented by way of illustrative example only. Those skilled in the art will recognize that a wide variety of other storage device configurations may be used in implementing embodiments of the invention.

Figure 2:
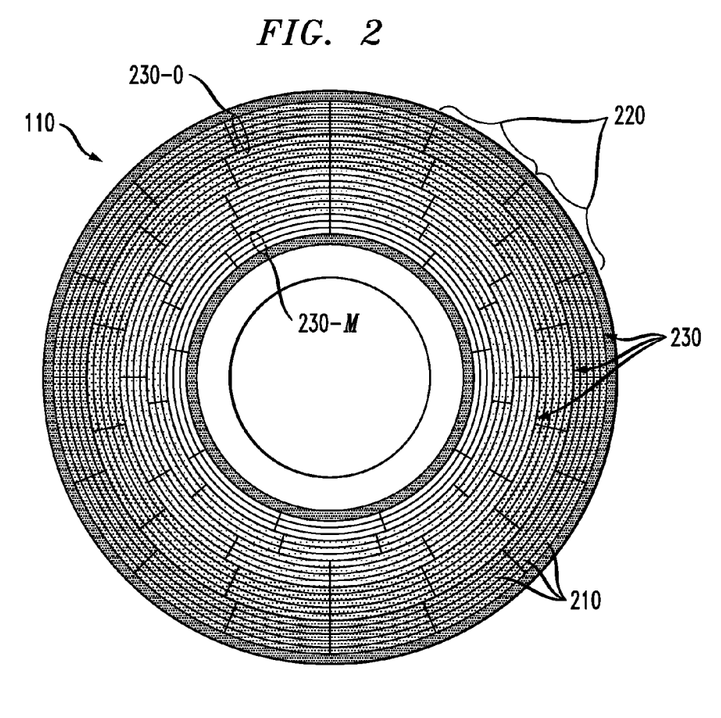
FIG. 2 shows a plan view of a storage disk in the storage device of FIG. 1.

FIG. 2 shows the storage surface of the storage disk 110 in greater detail. As illustrated, the storage surface of storage disk 110 comprises a plurality of concentric tracks 210. Each track is subdivided into a plurality of sectors 220 which are capable of storing a block of data for subsequent retrieval. The tracks located toward the outside edge of the storage disk have a larger circumference when compared to those located toward the center of the storage disk. The tracks are grouped into several annular zones 230, where the tracks within a given one of the zones have the same number of sectors. Those tracks in the outer zones have more sectors than those located in the inner zones. In this example, it is assumed that the storage disk 110 comprises M+1 zones, including an outermost zone 230-0 and an innermost zone 230-M.

The outer zones of the storage disk 110 provide a higher data transfer rate than the inner zones. This is in part due to the fact that the storage disk in the present embodiment, once accelerated to rotate at operational speed, spins at a constant angular or radial speed regardless of the positioning of the read/write head, but the tracks of the inner zones have smaller circumference than those of the outer zones. Thus, when the read/write head is positioned over one of the tracks of an outer zone, it covers a greater linear distance along the disk surface for a given 360° turn of the storage disk than when it is positioned over one of the tracks of an inner zone. Such an arrangement is referred to as having constant angular velocity (CAV), since each 360° turn of the storage disk takes the same amount of time, although it should be understood that CAV operation is not a requirement of embodiments of the invention.

Data bit density is generally constant across the entire storage surface of the storage disk 110, which results in higher data transfer rates at the outer zones. Accordingly, the outermost annular zone 230-0 of the storage disk has a higher average data transfer rate than the innermost annular zone 230-M of the storage disk. The average data transfer rates may differ between the innermost and outermost annular zones in a given embodiment by more than a factor of two. As one example embodiment, provided by way of illustration only, the outermost annular zone may have a data transfer rate of approximately 2.3 Gigabits per second (Gb/s), while the innermost annular zone has a data transfer rate of approximately 1.0 Gb/s. In such an implementation, the HDD may more particularly have a total storage capacity of 500 GB and a spindle speed of 7200 RPM, with the data transfer rates ranging, as noted above, from about 2.3 Gb/s for the outermost zone to about 1.0 Gb/s for the innermost zone.

The storage disk 110 may be assumed to include a timing pattern formed on its storage surface. Such a timing pattern may comprise one or more sets of servo address marks (SAMs) or other types of servo marks formed in particular sectors in a conventional manner. SAMs may therefore be viewed as an example of what are more specifically referred to herein as servo marks.

The particular data transfer rates and other features referred to in the embodiment described above are presented for purposes of illustration only, and should not be construed as limiting in any way. A wide variety of other data transfer rates and storage disk configurations may be used in other embodiments.

Embodiments of the invention will be described below in conjunction with FIGS. 3 to 7, in which the storage device 100 of FIG. 1 is configured to implement read channel circuitry comprising an LDPC decoder, and power management circuitry implemented in or otherwise associated with the read channel circuitry. The power management circuitry is configured to detect at least one power control condition of the read channel circuitry and to control insertion of idle clock cycles in a clock signal supplied to the decoder responsive to the detected power control condition. For example, the read channel circuitry may comprise a clock generator configured to provide the clock signal to the decoder, with the clock generator having a control input coupled to a control output of the power management circuitry and being configured to gate the clock signal responsive to a control signal from the power management circuitry. The power control condition may comprise the read channel circuitry reaching a specified power level, such as a peak power level.

Figure 3:
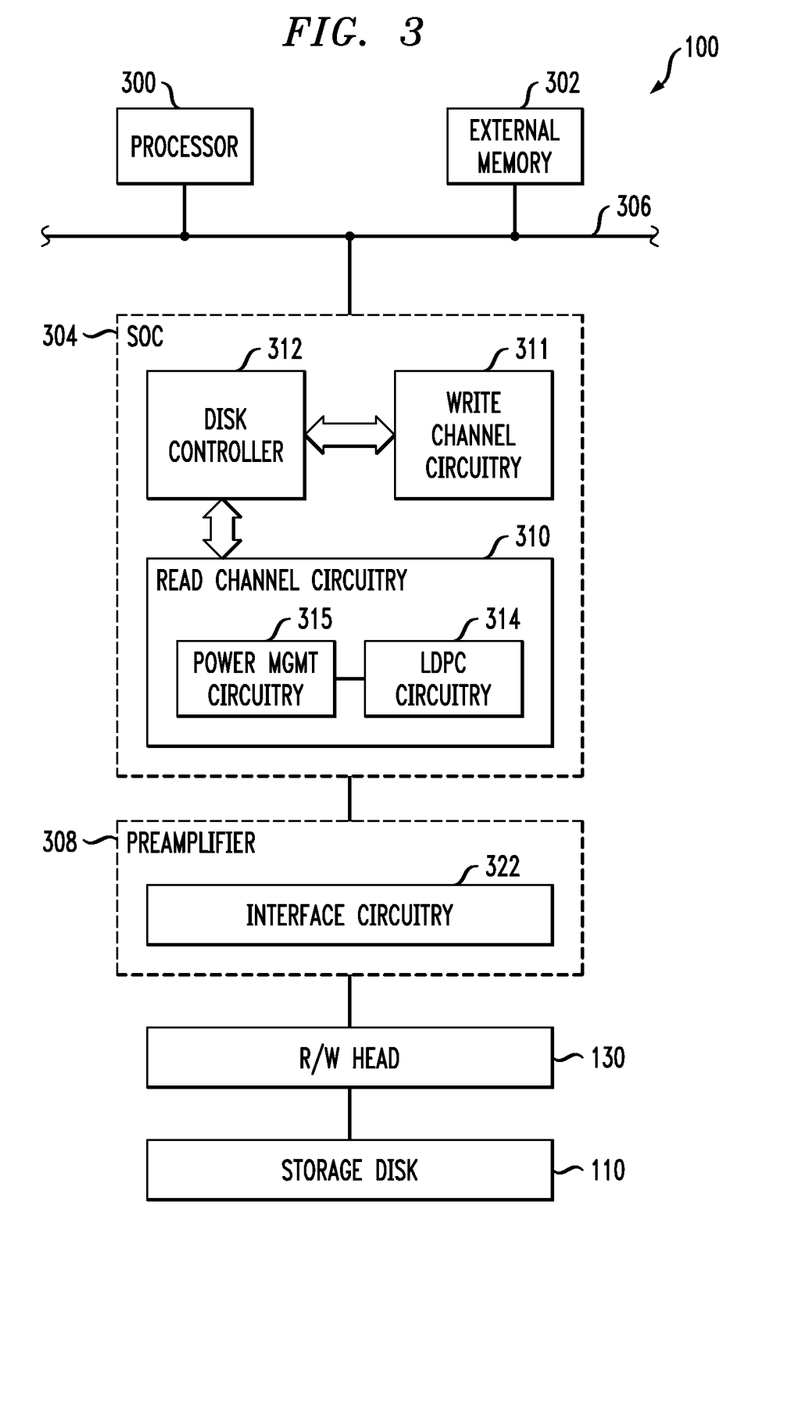
FIG. 3 is a block diagram of a portion of the storage device of FIG. 1 including an integrated circuit comprising read channel circuitry that includes an LDPC decoder and associated power management circuitry.

FIG. 3 shows a portion of the storage device 100 of FIG. 1 in greater detail. In this view, the storage device 100 comprises a processor 300, a memory 302 and a system-on-a-chip (SOC) 304, which communicate over a bus 306. The storage device further comprises a preamplifier 308 providing an interface between the SOC 304 and the read/write head 130. The memory 302 is an external memory relative to the SOC 304 and other components of the storage device 100, but is nonetheless internal to that storage device. The SOC 304 in the present embodiment includes read channel circuitry 310, write channel circuitry 311 and a disk controller 312, and directs the operation of the read/write head 130 in reading data from and writing data to the storage disk 110.

The bus 306 may comprise, for example, one or more interconnect fabrics. Such fabrics may be implemented in the present embodiment as Advanced eXtensible Interface (AXI) fabrics, described in greater detail in, for example, the Advanced Microcontroller Bus Architecture (AMBA) AXI v2.0 Specification, which is incorporated by reference herein. The bus may also be used to support communications between other system components, such as between the SOC 304 and the preamplifier 308. It should be understood that AXI interconnects are not required, and that a wide variety of other types of bus configurations may be used in embodiments of the invention.

The processor 300, memory 302, SOC 304 and preamplifier 308 may be viewed as collectively comprising one possible example of "control circuitry" as that term is utilized herein. Numerous alternative arrangements of control circuitry may be used in other embodiments, and such arrangements may include only a subset of the components 300, 302, 304 and 308, or portions of one or more of these components. For example, the SOC 304 itself may be viewed as an example of "control circuitry." The control circuitry of the storage device 100 in the embodiment as shown in FIG. 3 is generally configured to process data received from and supplied to the read/write head 130 and to control positioning of the read/write head 130 relative to the storage disk 110.

It should be noted that certain operations of the SOC 304 in the storage device 100 of FIG. 3 may be directed by processor 300, which executes code stored in external memory 302. For example, the processor 300 may be configured to execute code stored in the memory 302 for performing at least a portion of a power management process carried out by the SOC 304. Thus, at least a portion of the power management functionality of the storage device 100 may be implemented at least in part in the form of software code.

The external memory 302 may comprise electronic memory such as random access memory (RAM) or read-only memory (ROM), in any combination. In the present embodiment, it is assumed without limitation that the external memory 302 is implemented at least in part as a double data rate (DDR) synchronous dynamic RAM (SDRAM), although a wide variety of other types of memory may be used in other embodiments. The memory 302 is an example of what is more generally referred to herein as a "computer-readable storage medium." Such a medium may also be writable.

Although the SOC 304 in the present embodiment is assumed to be implemented on a single integrated circuit, that integrated circuit may further comprise portions of the processor 300, memory 302, bus 306 and preamplifier 308. Alternatively, portions of the processor 300, memory 302, bus 306 and preamplifier 308 may be implemented at least in part in the form of one or more additional integrated circuits, such as otherwise conventional integrated circuits designed for use in an HDD and suitably modified to implement power management circuitry as disclosed herein.

An example of an SOC integrated circuit that may be modified for use in embodiments of the invention is disclosed in U.S. Pat. No. 7,872,825, entitled "Data Storage Drive with Reduced Power Consumption," which is commonly assigned herewith and incorporated by reference herein.

Other types of integrated circuits that may be used to implement processor, memory or other storage device components of a given embodiment include, for example, a microprocessor, digital signal processor (DSP), application-specific integrated circuit (ASIC), field-programmable gate array (FPGA) or other integrated circuit device.

In an embodiment comprising an integrated circuit implementation, multiple integrated circuit dies may be formed in a repeated pattern on a surface of a wafer. Each such die may include control circuitry as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered embodiments of the invention.

Although shown as part of the storage device 100 in the present embodiment, one or both of the processor 300 and memory 302 may be implemented at least in part within an associated processing device, such as a host computer or server in which the storage device is installed. Accordingly, elements 300 and 302 in the FIG. 3 embodiment may be viewed as being separate from the storage device 100, or as representing composite elements each including separate processing or memory circuitry components from both the storage device and its associated processing device. As noted above, at least portions of the processor 300 and memory 302 may be viewed as comprising "control circuitry" as that term is broadly defined herein.

The read channel circuitry 310 of the storage device 100 in this embodiment comprises LDPC circuitry 314 coupled to power management circuitry 315. The SOC 304 is coupled to read/write head 130 via interfaces 322 of the preamplifier 308. The interface circuitry 322 may comprise write drivers as well as read detectors.

Although illustratively shown in FIG. 3 as being incorporated within the read channel circuitry 310, the power management circuitry 315 in other embodiments may be implemented at least in part externally to the read channel circuitry 310.

As noted previously, use of multi-level LDPC codes has led to a significant increase in the complexity of read channel circuitry, as well as a corresponding increase in power consumption of an SOC containing the read channel circuitry, and associated higher packaging costs. The power management circuitry 315 is therefore configured in the present embodiment to detect one or more power control conditions of the read channel circuitry 310, such as the read channel circuitry reaching a peak power level or other specified operating power level based on operation of the LDPC circuitry 314. Illustrative embodiments of the LDPC circuitry 314 and the power management circuitry 315 will be described in greater detail below in conjunction with FIGS. 4 and 5, respectively.

Figure 4:
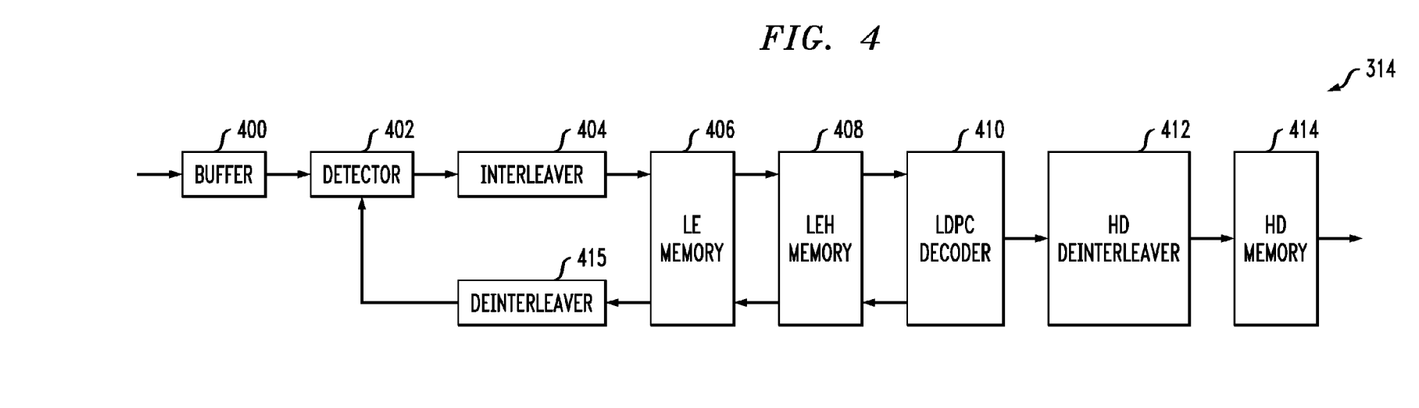
FIGS. 4 and 5 show more detailed views of respective portions of the read channel circuitry of FIG. 3.

Referring now to FIG. 4, in the LDPC circuitry 314, input data from an analog-to-digital converter (ADC) of the read channel circuitry 310 is stored in a buffer 400 and applied to a channel detector 402. The input data applied to the buffer 400 may also be referred to as Y data, and the buffer 400 may be referred to as a Y buffer. Detected data at the output of the detector 402 is applied to interleaver 404 which spreads any error in the detected data over multiple sectors of the storage disk. The resulting interleaved data is also referred to as L data. The interleaved L data is applied to an LE memory 406 and then to an LEH memory 408, and from the LEH memory 408 to the decoder 410.

The L data in the present embodiment more particularly denotes log likelihood ratio (LLR) data, indicating the LLR of two probabilities. The LE memory 406 stores L data and E data, where E data more particularly denotes extrinsic data given by subtracting input LLR data from output LLR data. The LEH memory 408 stores L data, E data and HD data, where HD data more particularly denotes hard decision data. By way of example, for a single-level or binary LDPC code, the hard decision data is either 0 or 1, and for a two-level LDPC code over a Galois field GF(4), the hard decision data is 0, 1, 2 or 3. The LE memory 406 in the present embodiment is configured to store multiple component codewords of each of L data and E data, while the LEH memory may be implemented, for example, as a ping-pong memory which only stores one component codeword of L data, one component codeword of E data, and one component codeword of HD data. Numerous other arrangements of LE and LEH memories are possible.

Also, in the storage device 100, it may be assumed without limitation that the sectors of the storage disk 110 are of two different sector lengths such as, for example, 0.5 k byte sectors and 4 k byte sectors. For an arrangement of this type, one 0.5 k byte sector may represent one codeword and one component codeword, and one 4 k byte sector may represent one codeword and four component codewords.

The LDPC decoder 410 is configured to correct errors in the detected data. If a given global iteration of the decoding process implemented in decoder 410 successfully converges, the E data is not transferred back, the HD data is applied to the HD deinterleaver 412, and the deinterleaved data is stored in HD memory 414. If the global iteration of the decoding process does not successfully converge, meaning that there are uncorrected errors still remaining in the corresponding detected data for that iteration, the E data is transferred back to the channel detector 402 via LEH memory 408, LE memory 406 and deinterleaver 415 in order to start a another global iteration. Each global iteration of the decoding process may include multiple local iterations of the decoder 410.

In the LDPC circuitry 314 as illustrated in FIG. 4, the read channel power consumption is adjusted by using power management circuitry 315 to control the insertion of idle clock cycles in a clock signal supplied to the LDPC decoder 410 responsive to a detected power control condition. For example, detection of a power control condition may comprise detection of the read channel circuitry 310 operating at or above a specified peak operating power, or detection of a particular logic level or other characteristic in a designated power control signal received from another part of the storage device 100.

As will be described in more detail below, idle clock cycles are inserted during a given local iteration period of the LDPC decoder 410 under the control of the power management circuitry 315. The same gated clock signal with idle clock cycles inserted can be applied not only to the LDPC decoder 410 but also to one or more other elements of the LDPC circuitry 314, such as the LEH memory 408.

Figure 5:
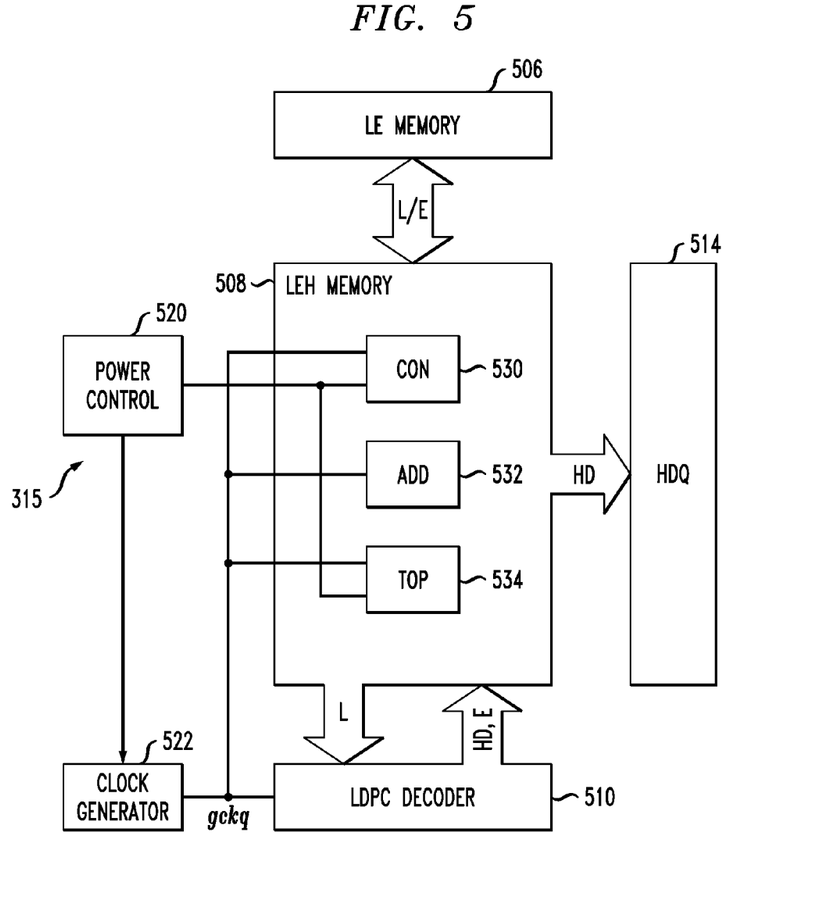

FIG. 5 shows another view of the LDPC circuitry 314, illustrating one possible implementation of its associated power management circuitry 315. The LDPC circuitry in this embodiment comprises LE memory 506, LEH memory 508, LDPC decoder 510 and an HD queue (HDQ) 514. Elements 506, 508, 510 and 514 generally correspond to LE memory 406, LEH memory 408, LDPC decoder 410 and HD memory 414, respectively, of the FIG. 4 embodiment, and operate in a similar manner. Thus, for example, the LE memory 506 sends L data to the LEH memory 508 and the LEH memory 508 sends E data to the LE memory 506. Also, the LEH memory 508 sends L data to the LDPC decoder 510, and the LDPC decoder 510 sends HD data and E data to the LEH memory 508. The LEH memory 508 in the present embodiment also sends HD to the HD deinterleaver, which is not explicitly shown in this figure, and to the HDQ 514.

The power management circuitry 315 in the FIG. 5 embodiment more particularly comprises a power control module 520 having a control output coupled to a control input of a clock generator 522. The clock generator 522 provides a gated clock signal gckq to the LDPC decoder 510. This clock signal is gated responsive to a control signal received at control input of the clock generator from the control output of the power control module 520. Gating of the clock signal is one manner in which idle clock cycles may be inserted in the clock signal before it is applied to the LDPC decoder 510, although it is to be understood that other techniques may be used to insert idle clock signals into a decoder clock. A gated clock signal gckq is also applied to the LEH memory 508 in the present embodiment, and more particularly to control (CON) module 530, address (ADD) module 532, and TOP module 534 of the LEH memory 508, as illustrated in the figure. The TOP module 534 may itself include multiple modules, such as additional control and address modules. The power control module 520 in the present embodiment also provides control signals to the CON module 530 and the TOP module 534 of the LEH memory 508, although these additional control signals may be eliminated in other embodiments.

Those skilled in the art will readily appreciate that separate gated clocks may be provided to the LDPC decoder 510 and the LEH memory 508. For example, in embodiments in which the LEH memory 508 runs at half the clock rate of the LDPC decoder 510, the clock generator may be configured to generate separate gated clocks for each at the respective clock rates. The gated clock signal output gckq of clock generator 522 may therefore be viewed as comprising multiple distinct clock signals.

As indicated above, the power control module 520 detects a power control condition of the read channel circuitry 310, such as the read channel circuitry reaching a specified peak operating power level, and in response to that detected condition causes the gated clock signal to be generated by the clock generator 522. For example, under control of the power control module 520, a predetermined number of the idle clock cycles may be inserted in each of one or more local iteration periods of the LDPC decoder 510.

It should be noted that different numbers of idle clock cycles may be inserted for different local iteration periods of the LDPC decoder 510. Thus, for example, the particular number of idle clock cycles inserted in the clock signal may be determined as a function of a size of a corresponding storage sector for which data is currently being processed by the read channel circuitry 310.

As a more particular example, for a first storage sector size a first number of idle clock cycles may be inserted responsive to the detected power control condition and for a second storage sector size larger than the first storage sector size a second number of idle clock cycles larger than the first number of idle clock cycles may be inserted responsive to the detected power control condition.

Thus, the power management circuitry 315 comprising power control module 520 may be configured to support multiple operating modes in which respective different numbers of idle clock cycles are inserted in the clock signal supplied to the LDPC decoder 510 responsive to the detected power control condition.

Additionally or alternatively, the power management circuitry 315 comprising power control module 520 may be configured to support multiple operating modes each providing a different reduction in operating power of the read channel circuitry 310.

Referring again to the embodiment in which the storage disk 110 has two different sector sizes, namely 0.5 k byte sectors and 4 k byte sectors, idle clock cycles can be inserted during a given local iteration period of the LDPC decoder 510. Local iteration periods for the different size sectors will generally have different numbers of clock cycles. For example, the local iteration periods for the 0.5 k byte and 4 k byte sectors may illustratively include 28 and 54 clock cycles, respectively.

Assume that a given control signal denoted sif_idle_clk_mode provided by the power control module 520 to the clock generator 522 is used to control the number of idle cycles for a given local iteration period for a 0.5 k byte sector that would normally include 28 clock cycles. This exemplary control signal in the context of the present embodiment may take on the following values:

sif_idle_clk_mode=0 normal clock with no idle cycles inserted
  sif_idle_clk_mode=1 four idle cycles inserted
  sif_idle_clk_mode=2 six idle cycles inserted
  sif_idle_clk_mode=3 eight idle cycles inserted Each of the different numbers of inserted idle cycles in this example will produce a different reduction in operating power for the LDPC decoder 510 and its associated circuitry relative to the case without any idle cycles inserted. The amount of the reduction increases with the number of inserted idle cycles. The idle cycles should be inserted in a manner that avoids overlap with signals that indicate start or completion of a decoding process, validity of conversion or parity outputs, as well as other related signals that may be incompatible with insertion of an idle clock cycle.

The power control module 520 may be configured to detect the power control condition of the read channel circuitry 310 using any of a number of different techniques, examples of which have been mentioned previously herein. Other examples may include use of a voltage sensor, detection of one or more specified block activities, or combinations of these or other power level indicators. The power management circuitry 315 comprising power control module 520 may be configured to permit user selection between different detection mechanisms, such as selection between use of a voltage sensor or block activities, as well as specification of appropriate detection thresholds for each such mechanism.

The illustrative embodiments provide a number of significant improvements relative to conventional read channel circuitry arrangements. For example, by inserting idle clock cycles into a clock signal supplied to an LDPC decoder of LDPC circuitry 314 responsive to one or more detected power control conditions of its associated read channel circuitry 310, overall power consumption of the storage device 100 is controlled in an efficient manner, leading to improved operating performance and lower packaging costs. In addition, the power management circuitry 315 in illustrative embodiments does not adversely impact circuit area requirements and achievable error rate.

The power management circuitry 315 can be configured to have a short response time, thereby providing accurate and effective control of decoder power once a given power control condition is met.

It is to be appreciated that the particular circuitry arrangements shown in FIGS. 3-5 are presented by way of example only, and other embodiments of the invention may utilize other types and arrangements of elements for implementing power management functionality for a read channel decoder as disclosed herein. As mentioned above, a gated clock from clock generator 522 may be applied not only to the LDPC decoder 510 but also to other portions of the LDPC circuitry 314, such as the LEH memory 508. In other embodiments, other portions of the LDPC circuitry in addition to or in place of the LEH memory 508 may receive a gated clock signal from clock generator 522. Alternatively, multiple gated clock signals may be generated and supplied to different portions of the LDPC circuitry 314. Moreover, techniques other than clock gating may be used to insert idle clock cycles in a given clock signal that is supplied to a read channel decoder.

As mentioned previously, the storage device configuration can be varied in other embodiments of the invention. For example, the storage device may comprise a hybrid HDD which includes a flash memory in addition to one or more storage disks.

It should also be understood that the particular storage disk configuration and recording mechanism can be varied in other embodiments of the invention. For example, a variety of recording techniques including SMR, BPM, HAMR and MAMR can be used in one or more embodiments of the invention.

Figure 6:
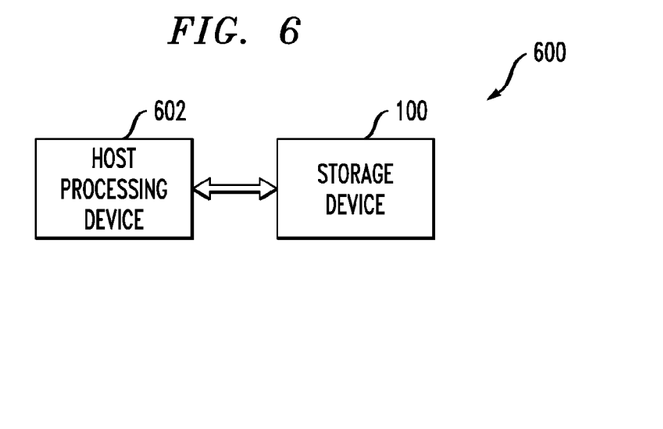
FIG. 6 illustrates interconnection of the storage device of FIG. 1 with a host processing device in a data processing system.

FIG. 6 illustrates a processing system 600 comprising the disk-based storage device 100 coupled to a host processing device 602, which may be a computer, server, communication device, etc. Although shown as a separate element in this figure, the storage device 100 may be incorporated into the host processing device. Instructions such as read commands and write commands directed to the storage device 100 may originate from the processing device 602, which may comprise processor and memory elements similar to those previously described in conjunction with FIG. 3.

Figure 7:
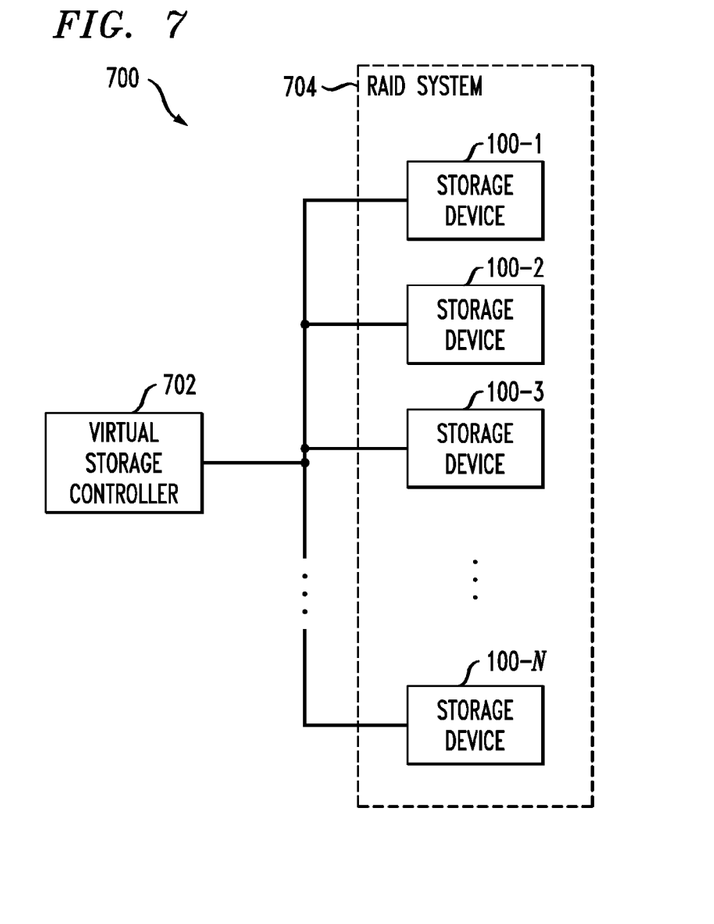
FIG. 7 shows a virtual storage system incorporating a plurality of disk-based storage devices of the type shown in FIG. 1.

Multiple storage devices 100-1 through 100-N possibly of various different types may be incorporated into a virtual storage system 700 as illustrated in FIG. 7. The virtual storage system 700, also referred to as a storage virtualization system, illustratively comprises a virtual storage controller 702 coupled to a RAID system 704, where RAID denotes Redundant Array of Independent storage Devices. The RAID system more specifically comprises N distinct storage devices denoted 100-1, 100-2, . . . 100-N, one or more of which may be HDDs and one or more of which may be solid state drives. Furthermore, one or more of the HDDs of the RAID system are assumed to be configured to include read channel circuitry and associated power management circuitry as disclosed herein. These and other virtual storage systems comprising HDDs or other storage devices are considered embodiments of the invention. The host processing device 602 in FIG. 6 may also be an element of a virtual storage system, and may incorporate the virtual storage controller 702.

It should again be emphasized that the above-described embodiments of the invention are intended to be illustrative only. For example, other embodiments can use different types and arrangements of storage disks, read/write heads, read channel circuitry, power management circuitry, decoders, power control conditions, and other storage device elements for implementing the described power management functionality. Also, the particular manner in power control conditions of the read channel circuitry are detected, and idle clock cycles are inserted in a clock signal supplied to a decoder, may be varied in other embodiments. These and numerous other alternative embodiments within the scope of the following claims will be apparent to those skilled in the art.

What is claimed is:

1. An apparatus comprising:
   read channel circuitry comprising a decoder; and
   power management circuitry associated with the read channel circuitry;
   the power management circuitry being configured to detect at least one power control condition of the read channel circuitry and to control insertion of idle clock cycles in a clock signal supplied to the decoder responsive to the detected power control condition.

2. The apparatus of claim 1 wherein the decoder comprises a low-density parity check decoder.

3. The apparatus of claim 1 wherein the power management circuitry is implemented within the read channel circuitry.

4. The apparatus of claim 1 wherein the read channel circuitry further comprises a clock generator configured to provide the clock signal to the decoder, the clock generator having a control input coupled to a control output of the power management circuitry and being configured to gate the clock signal responsive to a control signal from the power management circuitry.

5. The apparatus of claim 1 wherein the power control condition comprises the read channel circuitry reaching a specified operating power level.

6. The apparatus of claim 2 wherein under control of the power management circuitry a predetermined number of the idle clock cycles are inserted in each of one or more local iteration periods of the low-density parity check decoder.

7. The apparatus of claim 2 wherein under control of the power management circuitry different numbers of idle clock cycles are inserted for different local iteration periods of the low-density parity check decoder.

8. The apparatus of claim 1 wherein a number of idle clock cycles inserted in the clock signal is determined as a function of a size of a corresponding storage sector for which data is currently being processed by the read channel circuitry.

9. The apparatus of claim 8 wherein for a first storage sector size a first number of idle clock cycles is inserted responsive to the detected power control condition and for a second storage sector size larger than the first storage sector size a second number of idle clock cycles larger than the first number of idle clock cycles is inserted responsive to the detected power control condition.

10. The apparatus of claim 1 wherein the power management circuitry is configured to support a plurality of operating modes in which respective different numbers of idle clock cycles are inserted in the clock signal supplied to the decoder responsive to the detected power control condition.

11. The apparatus of claim 1 wherein the power management circuitry is configured to support a plurality of operating modes each providing a different reduction in operating power of the read channel circuitry.

12. The apparatus of claim 1 wherein the power management circuitry is configured to detect said at least one power control condition of the read channel circuitry utilizing a voltage sensor.

13. The apparatus of claim 1 wherein the power management circuitry is configured to detect said at least one power control condition of the read channel circuitry by detecting one or more specified block activities.

14. The apparatus of claim 1 further comprising a disk controller coupled to the read channel circuitry.

15. The apparatus of claim 1 wherein the read channel circuitry and associated power management circuitry are fabricated in at least one integrated circuit.

16. A storage device comprising the apparatus of claim 1.

17. A virtual storage system comprising the storage device of claim 16.

18. A method comprising the steps of:
   reading data from a storage medium;
   processing the data in a decoder of read channel circuitry;
   detecting at least one power control condition of the read channel circuitry; and
   controlling insertion of idle clock cycles in a clock signal supplied to the decoder responsive to the detected power control condition.

19. The method of claim 18 wherein the step of controlling insertion of idle clock signals in the clock signal supplied to the decoder comprises providing a control signal to a control input of a clock generator so as to cause the clock signal to be gated by the clock generator.

20. A non-transitory computer-readable storage medium having embodied therein executable code for performing the steps of the method of claim 18.

* * * * *

UNITED STATES PATENT AND TRADEMARK OFFICE
CERTIFICATE OF CORRECTION

PATENT NO.        : 8,730,603 B2  
APPLICATION NO.   : 13/609387  
DATED             : May 20, 2014  
INVENTOR(S)       : Jing Lu et al.

Page 1 of 1

It is certified that error appears in the above-identified patent and that said Letters Patent is hereby corrected as shown below:

In the Specification

Col. 8, line 22, please insert --data-- before "to the HD deinterleaver"

Signed and Sealed this  
Fifth Day of August, 2014

Michelle K. Lee  
*Deputy Director of the United States Patent and Trademark Office*